US005873493A

United States Patent [19]
Robinson

[11] Patent Number: 5,873,493
[45] Date of Patent: Feb. 23, 1999

[54] INTEGRALLY MOLDED MEASURER/ DISPENSER

[75] Inventor: Clayton L. Robinson, Newburgh, Ind.

[73] Assignee: Rexam Plastics Inc., Evansville, Ind.

[21] Appl. No.: 872,878

[22] Filed: Jun. 11, 1997

Related U.S. Application Data

[60] Provisional application No. 60/038,367 Feb. 13, 1997.

[51] Int. Cl. [6] .......... G01F 11/26

[52] U.S. Cl. .......... 222/109; 222/158; 222/454; 222/556

[58] Field of Search .......... 222/158, 109, 222/111, 480, 454–457, 443, 556

[56] References Cited

U.S. PATENT DOCUMENTS

| | | | |
|---|---|---|---|
| 1,614,022 | 1/1927 | Teichmann . | |
| 2,373,551 | 4/1945 | De Lauder . | |
| 4,128,189 | 12/1978 | Baxter | 222/109 |
| 4,666,065 | 5/1987 | Ohren | 222/109 |
| 5,011,048 | 4/1991 | Mark | 222/455 |
| 5,064,106 | 11/1991 | Butler et al. | 222/456 |
| 5,465,871 | 11/1995 | Robbins, III | 222/456 X |
| 5,509,579 | 4/1996 | Robbins, III | 222/158 X |
| 5,509,582 | 4/1996 | Robbins, III . | |
| 5,547,109 | 8/1996 | Robbins, III . | |
| 5,711,463 | 1/1998 | Chen et al. | 222/456 |

FOREIGN PATENT DOCUMENTS

| | | | |
|---|---|---|---|
| 581365 | 10/1931 | Germany | 222/455 |
| 425513 | 3/1935 | United Kingdom | 222/454 |

*Primary Examiner*—Kevin P. Shaver
*Attorney, Agent, or Firm*—Middleton & Reutlinger; Daniel C. Stelter, Esq.

[57] ABSTRACT

A closure providing a side wall having first and second distal ends, an inner surface and an outer perimeter. A cone-shaped divider projects inwardly and upwardly from a lower perimeter of the side wall and includes a drain-back orifice therethrough. The cone-shaped divider further includes an apex having an opening therethrough. The closure further provides a lid pivotally attached at an outer diameter thereof to the outer perimeter of the side wall first distal end by an integral hinge. The lid includes a shaped substantially conforming to the side wall perimeter.

7 Claims, 10 Drawing Sheets

INTEGRALLY MOLDED MEASURER/ DISPENSER

CROSS-REFERENCE TO RELATED APPLICATION

This application claims priority from my U.S. Provisional Patent Application Ser. No. 60/038367 entitled "Integrally Molded Measure/Dispenser" filed on Feb. 13, 1997.

BACKGROUND OF THE INVENTION

1. Technical Field of the Invention

The present invention relates to a closure for use on a container. More particularly, the present invention relates to a closure for use on a container wherein the closure includes an integral measuring and dispensing chamber having separate measuring and dispensing orifices.

2. Discussion of the Prior Art

It is often desirable for a container to function both as a means by which a product held therein is transported from one location to another and also as a means by which a fixed quantity of the product may be dispensed therefrom, while permitting any unused quantity of the product to be stored therein for future dispensing and use. Containers of this design typically store more product than is required by the user for any single use thereof. Thus, a user who wishes to dispense a fixed quantity of the product (and retain the remainder of the unused product within the container for future dispensing and use) must provide an external means by which dispensing of the product can be measured. Such a requirement is expensive and cumbersome, as it requires the user to purchase and manage both a measuring device and the container. Thus, it is desirable to provide a closure which includes an integral measuring and dispensing chamber.

Various dispensing closures having measuring chambers have been proposed by the prior art; such as, for example, U.S. Pat. No. 5,547,109 to Robbins, which teaches a measuring/dispensing cap and container assembly having an arcuate weir panel defining both a measuring chamber and a dispensing aperture. Further, U.S. Pat. No. 5,509,582 to Robbins teaches a similar dispensing cap including an internal measuring chamber having a flat weir panel. However, use of the weir panel according to either of these references prevents use of the full cross-sectional area of the container to provide a measuring chamber. Accordingly, the measuring chamber must be disposed deeper within the container in order to provide a suitable measuring chamber volume, thereby increasing overall container size. Thus, it is desirable to provide a closure which includes an integral measuring and dispensing chamber, and which furthermore utilizes the full cross-sectional area of the container to define the measuring and dispensing chamber.

SUMMARY OF THE INVENTION

It is an object of the present invention to provide a closure for use on a container, wherein the closure includes an integral measuring and dispensing chamber.

It is another object of the present invention to provide a closure for use on a container, wherein the closure includes an integral measuring and dispensing chamber having separate measuring and dispensing orifices.

It is a further object of the present invention to provide a closure for use on a container, wherein the closure provides a measuring chamber which utilizes the full cross-sectional area of the container.

A closure according to the preferred embodiment of the present invention includes a side wall having first and second distal ends, an inner surface, and an outer perimeter; a cone-shaped divider projecting inwardly and upwardly from a lower perimeter thereof, said lower perimeter being coincident to said inner surface of said side wall between said first and second distal ends thereof, said divider having an opening at its apex; and, a lid pivotally attached at an outer diameter thereof to said outer perimeter of said side wall at said first distal end thereof by an integral lid hinge, said lid outer diameter conforming to said outer perimeter.

The cone-shaped divider is disposed such that the lower perimeter is nearer the second distal end of the side wall than the apex. The opening in the apex defines a measuring orifice and a drain-back orifice is provided through the divider near the lower perimeter.

The lid includes a dispensing orifice disposed therethrough near the outer diameter thereof opposite the lid hinge. A dispensing door is pivotally attached to the lid by an integral door hinge disposed between the dispensing orifice and the lid hinge and extends outwardly therefrom towards the lid outer diameter to cover the dispensing orifice. The lid further includes a series of measuring gradients disposed longitudinally along an upper surface of the lid near the lid hinge. The lid is radially oriented relative to the divider such that the drain-back orifice is offset from the lid hinge by about 90°.

BRIEF DESCRIPTION OF THE DRAWINGS

A better understanding of the present invention will be had upon reference to the following description in conjunction with the accompanying drawings in which like numerals refer to like parts, and wherein.

DETAILED DESCRIPTION OF THE PREFERRED EMBODIMENT

Figure 1:
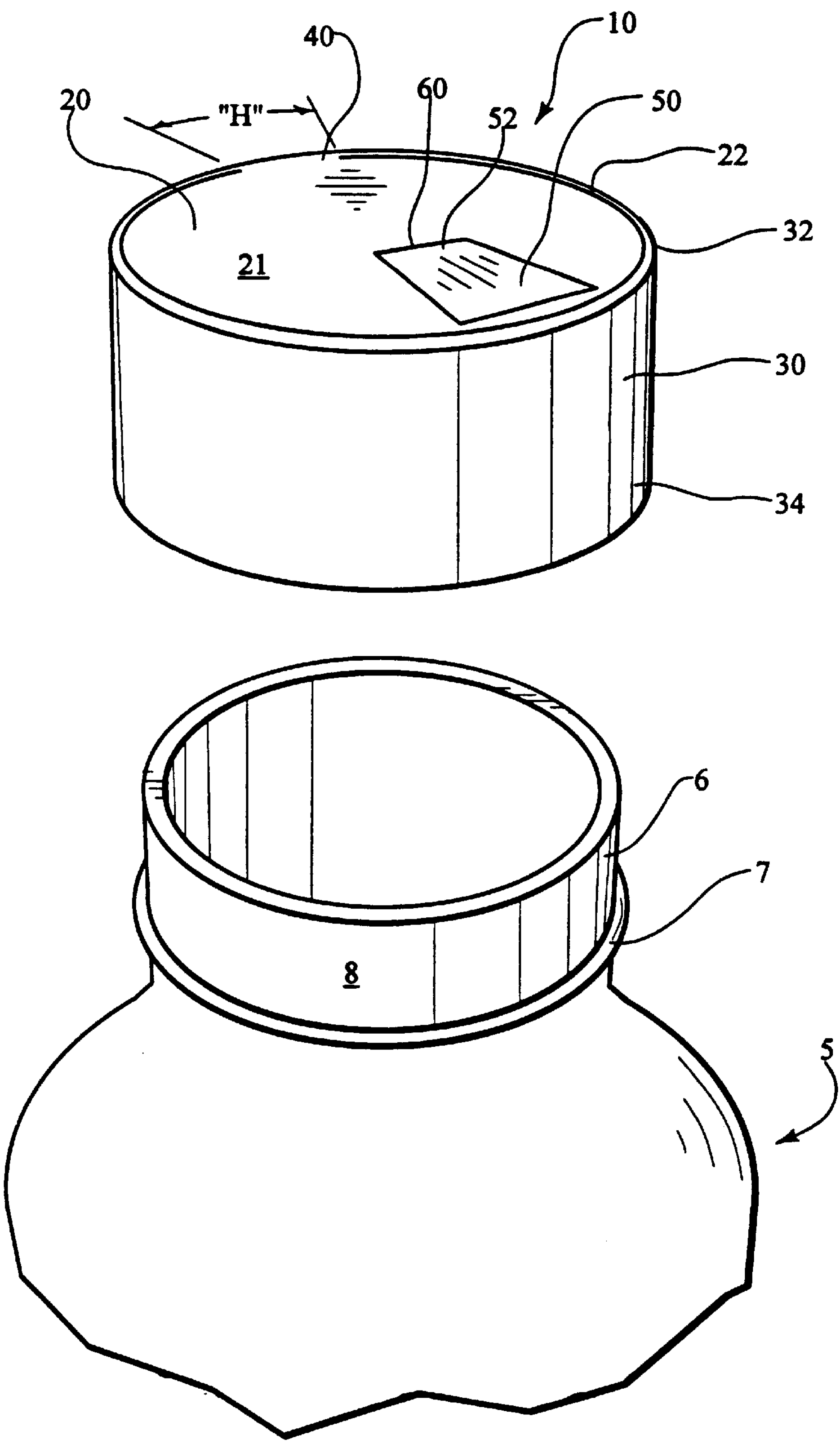
FIG. 1 is an exploded perspective view of a top of a closure according to the preferred embodiment of the present invention with a top of a container neck showing the lid and the dispensing door both in a "closed" position.
Figure 3:
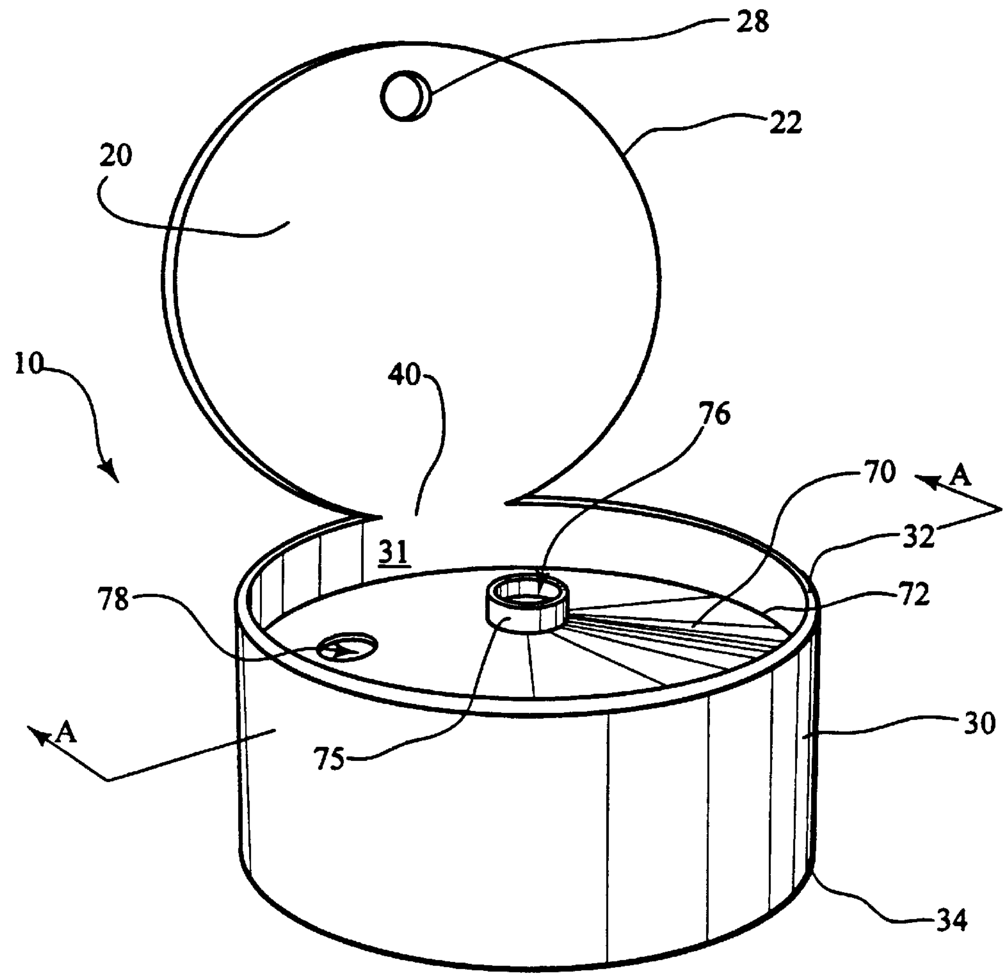
FIG. 3 is an exploded perspective view of the top of the closure of FIG. 1 with the top of the container neck showing the lid and the dispensing door both in an "open" position.
Figure 8:
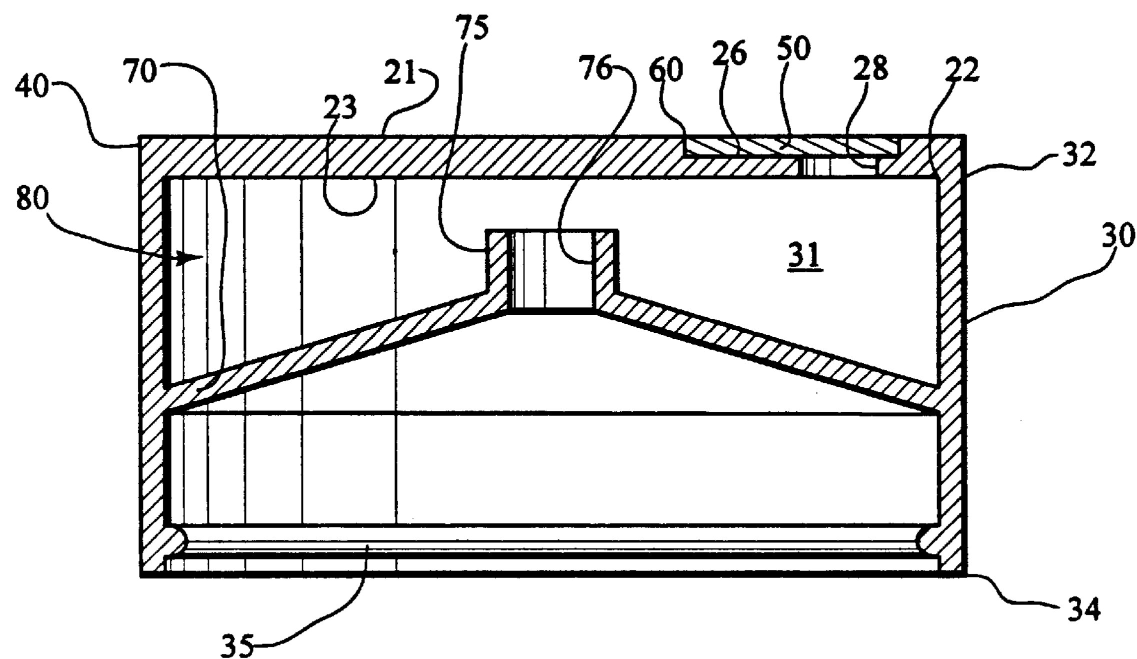
FIG. 8 is a sectional view of the closure of FIG. 1, taken along line B—B of FIG. 1 showing both the lid and the dispensing door in a "closed" position.

With reference to FIG. 1, a closure 10 for use on a container 5 includes a lid 20 having an outer diameter 22, a side wall 30 having a first distal end 32 and a second distal end 34 opposite the first distal end 32 and a cone-shaped divider 70 (FIG. 3) projecting inwardly and upwardly from an inner surface 31 of the side wall 30. The side wall 30 is attached to the lid 10 by an integral lid hinge 40 formed coterminously with the lid outer diameter 22 and the side wall first distal end 32 within an arcuate hinge region "H". The lid hinge 40 permits the lid 20 to pivot thereabout from a "closed" position, as best shown in FIGS. 1 and 8, to an "open" position, as best shown in FIG. 3. The lid 20 may also be provided with means (not shown) to secure the lid 20 to the side wall 30 while the lid 20 is in the "closed" position. The closure 10 is preferably made from a translucent plastic material, such as, for example, polyethylene, polypropylene, and the like, although any similar, suitable material may be substituted in place thereof without departing from the sprit or the scope of the present invention. The container 5 includes a container neck 6 having an external continuous retaining lip 7 provided on an exterior surface 8 of the container neck 6.

Figure 2:
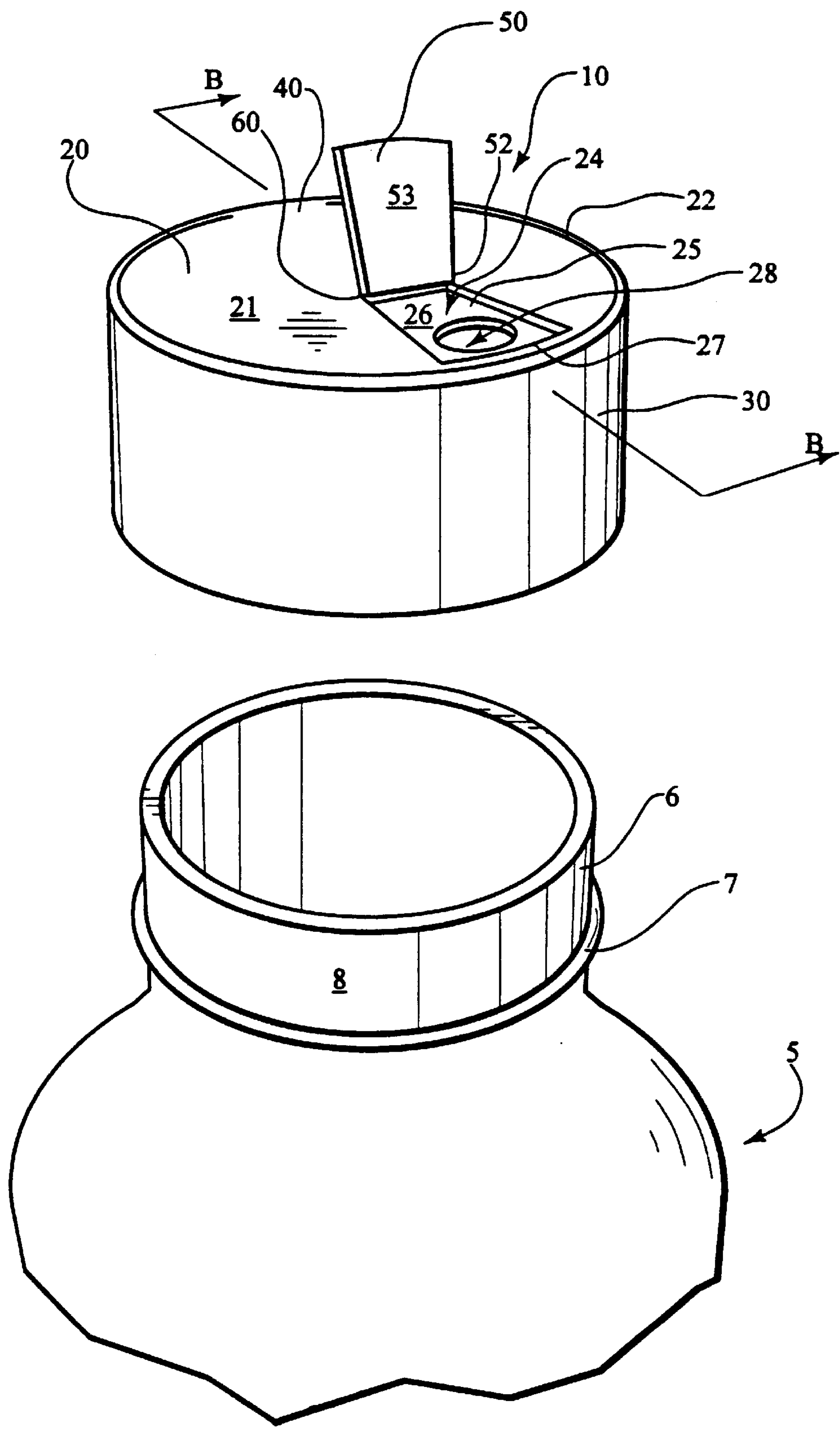
FIG. 2 is an exploded perspective view of the top of the closure of FIG. 1 with the top of the container neck showing the lid in a "closed" position and the dispensing door in an "open" position.
Figure 9:
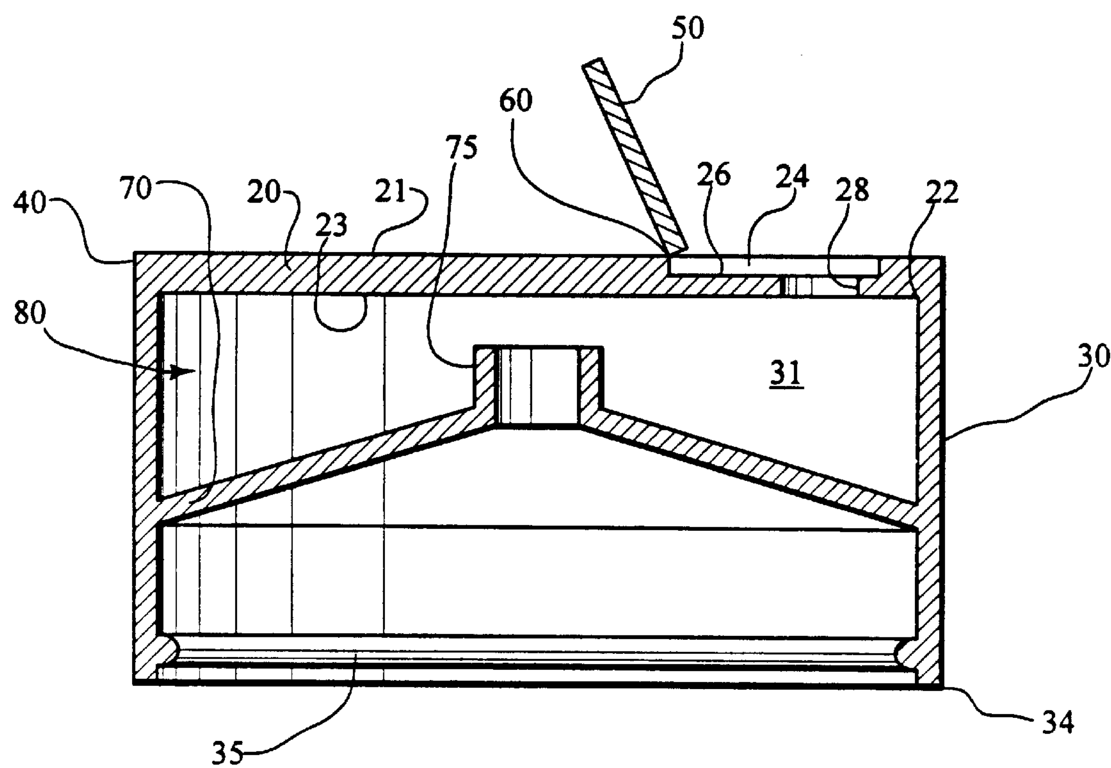
FIG. 9 is a sectional view of the closure of FIG. 1, taken along line B—B of FIG. 2 showing the lid in a "closed" position and the dispensing door in an "open" position; and, FIG. 10 is a sectional view of the closure of FIG. 1, taken along line B—B of FIG. 4 showing both the lid and the dispensing door in an "open" position.

With combined reference to FIGS. 1 and 2, the lid 20 includes an integrally-formed dispensing door 50 disposed in a top surface 21 of the lid 20 opposite the lid hinge 40. The dispensing door 50 is attached to the lid 20 by an integral door hinge 60 formed coterminously with the lid top surface 21 between the lid outer diameter 22 and the lid hinge 40 and the dispensing door 50 at an inward end 52 thereof. The door hinge 60 permits the dispensing door 50 to pivot thereabout from a "closed" position, as best shown in FIGS. 1 and 8, to an "open" position, as best shown in FIGS. 2 and 9. The lid 20 includes a door receiving recess 24 formed in the top surface 21 thereof which is defined by the size and shape of the dispensing door 50.

The lid 20 and the dispensing door 50 cooperate so that when the dispensing door 50 is in the "closed" position, an upper surface 51 of the dispensing door 50 is substantially coplanar with the upper surface 21 of the lid 20 and a lower surface 53 of the dispensing door 50 abuts an upper surface 26 of a door receiving step 25 formed in the lid 20 by the door receiving recess 24. The dispensing door 50 may also be provided with means (not shown) to secure the dispensing door 50 to the lid 20 while the dispensing door 50 is in the "closed" position. The door receiving step 25 is provided with a dispensing orifice 28 therethrough near an end 27 thereof diametrically opposing the door hinge 60.

With reference to FIG. 3, the divider 70 includes a lower perimeter 72 coincident with the side wall inner surface 31 between the side wall first distal end 32 and the side wall second distal 34 and is substantially coaxial therewith. Further, the divider 70 projects inwardly and upwardly with an apex having a measuring orifice 76 therein. A cylindrical wall 75 circumscribes the orifice 76. A drain-back orifice 78 is provided through the divider 70 near the lower perimeter 72 radially offset from the lid hinge 40 by 90°.

Figure 7:
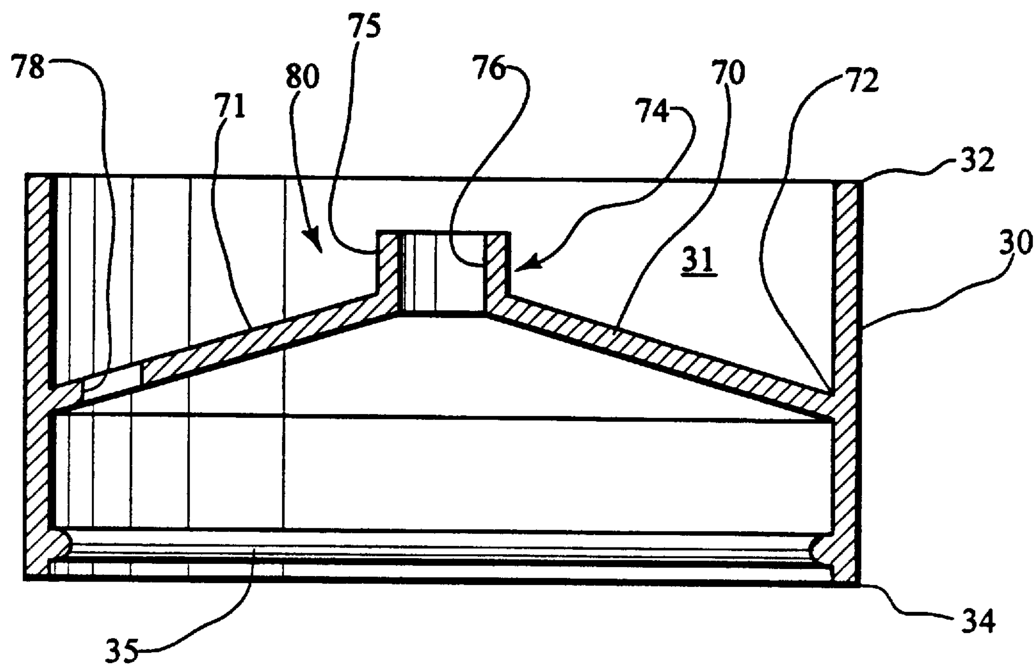
FIG. 7 is a sectional view of the closure of FIG. 1 taken along line A—A of FIG. 3.

With reference to FIG. 7, a measuring chamber 80 is defined by the cooperation of the side wall inner surface 31, an upper surface 71 of the cone-shaped divider 70 and the first distal end 32 of the side wall 30. A continuous retaining bead 35 is provided on the inner surface 31 of the side wall 30 towards the second distal end 34 thereof and is sized to engage the mating external retaining lip 7 provided on the container neck 6.

Figure 4:
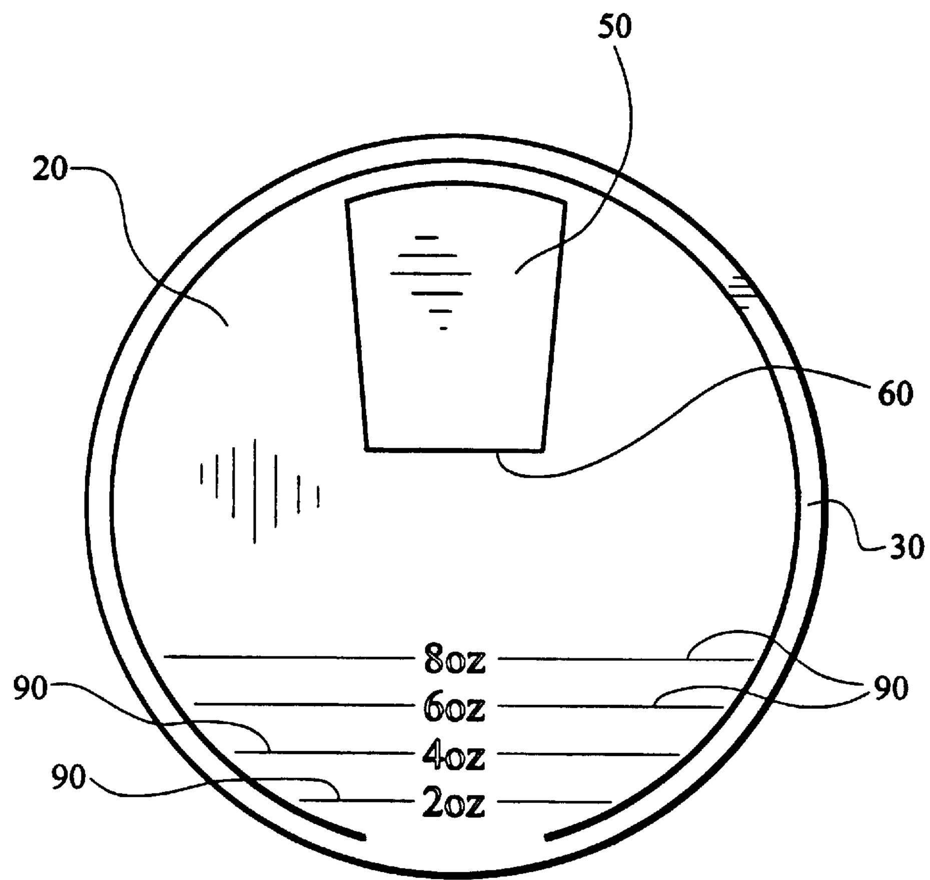
FIG. 4 is a top view of the closure of FIG. 1 showing the lid and the dispensing door both in a "closed" position.

With reference to FIG. 4, measuring gradients 90 are provided on the top surface 21 of the lid 20 to aid a user in dispensing a predetermined quantity of the product held within the container 5. The values of the measuring gradients 90—and their respective locations on the lid 20—may vary depending upon various factors, such as, for example, the size of the container 5, the size of the measuring chamber 80 and the amount of product typically dispensed from the container 5. The measuring gradients 90 may be placed upon the lid 20 by any suitable means, such as, for example, by printing or by being molded integrally with the lid 20, and are generally oriented relative to the lid 20 so that they are readable outwardly.

In use, the closure 10 is snapped onto the container neck 6 by cooperation of the mating closure retaining bead 35 and the container neck retaining lip 7. The lid 20 and the dispensing door 50 are pivoted into their respective "closed" positions. A user then orients the container/closure assembly so that the measuring gradients 90 are closer to him than is the dispensing door 50. The container/closure assembly is then inverted, so that the closure is substantially at an elevation below the elevation of the container, thereby permitting the product to pass through the measuring orifice 76 and into the measuring chamber 80. The translucency of the lid 20 material permits the user to monitor the quantity of product which has passed into the measuring chamber 80, using the measuring gradients 90 as a guide. If the user determines that too much product has passed into the measuring chamber 80, he returns the container/closure assembly to a generally vertical orientation, thereby permitting any undesirable quantity of the product to flow back into the container 5 through the drain-back orifice 78. Again, if too much product has passed back into the container 5, the user inverts the container/closure assembly so that the closure 10 is again at an elevation substantially below the elevation of the container 5, thereby permitting additional product to pass back into the measuring chamber 80. The user continues this process until the desired quantity of the product is present in the measuring chamber 80.

Once the predetermined quantity of the product is present in the measuring chamber 80, the user positions the container/closure assembly to an approximately horizontal orientation, and rotates the container/closure assembly so that the dispensing door 50 is at an elevation substantially lower than the elevation of the measuring orifice 76. The user pivots the dispensing door 50 to the "open" position, thereby permitting the product to pass from within the measuring chamber 80 through the dispensing orifice 28.

Figure 10:
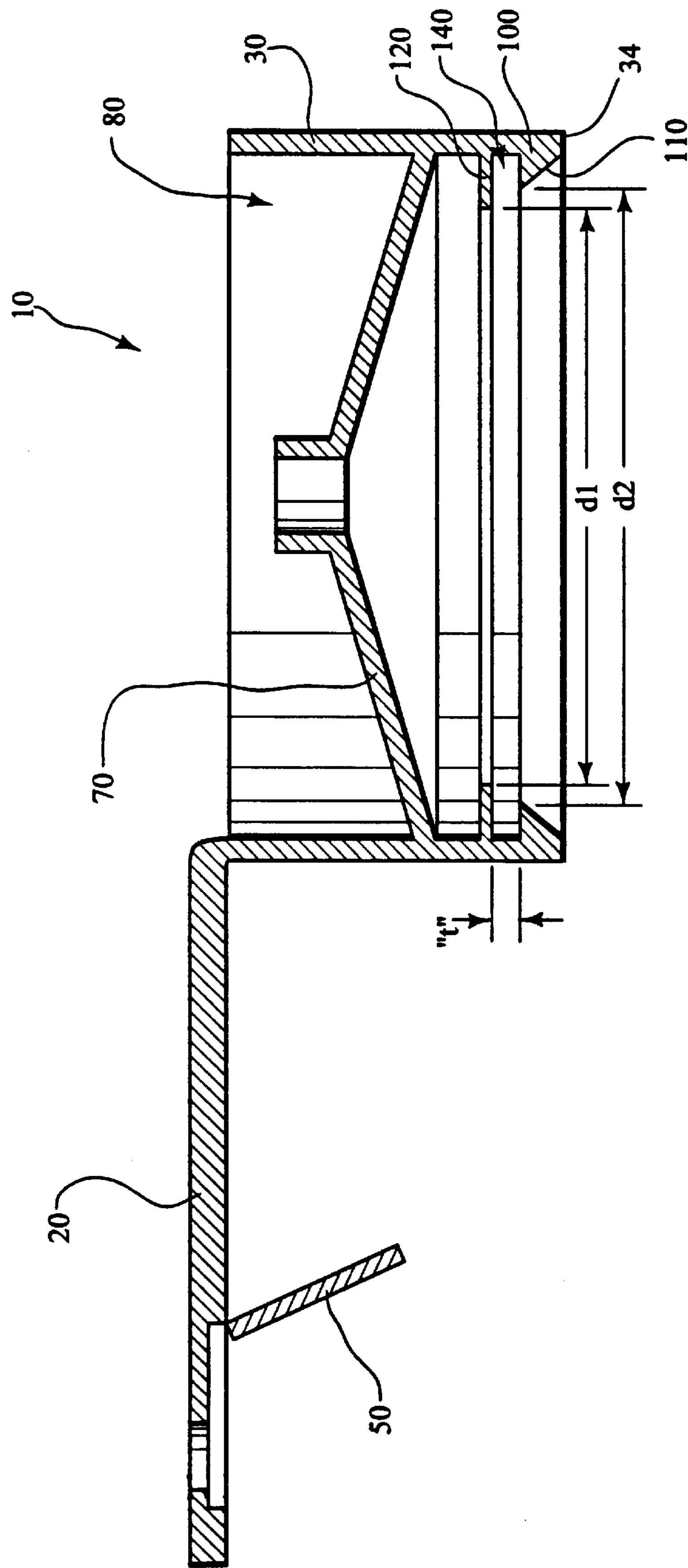

With reference to FIG. 10, another embodiment of the present invention includes a beveled retaining bead 100 disposed on the inner surface 31 of the side wall 30 towards the second distal end 34 thereof, and a retaining shelf 120 disposed on the inner surface 31 of the side wall 30 offset from the beveled retaining bead 100 towards the first distal end 32 of the side wall 30 by a distance "t", thereby defining a lip receiving recess 140 therebetween. The retaining shelf 120 includes an inner diameter "$d_1$" which is less than an inner diameter "$d_2$" of the beveled retaining bead 100. The retaining bead 100 further includes an annular beveled face 110 disposed downwardly therefrom. A closure 10 according to this embodiment provides a reinforced structure suitable for use in combination with containers having a large container neck diameter (not shown), which include a retaining lip (not shown) adapted for being received by the lip receiving recess 140.

In a even another embodiment of the present invention, mating threads (not shown) may be provided on the inner surface 31 of the side wall 30 towards the second distal end 34 thereof and on the external surface 8 of the container neck 7 in place respectively of the closure retaining bead 35 and the container retaining lip 7. Additional embodiments further include other means of affixing the closure 10 to the container neck 6 to provide sealing engagement therebetween.

Figure 5:
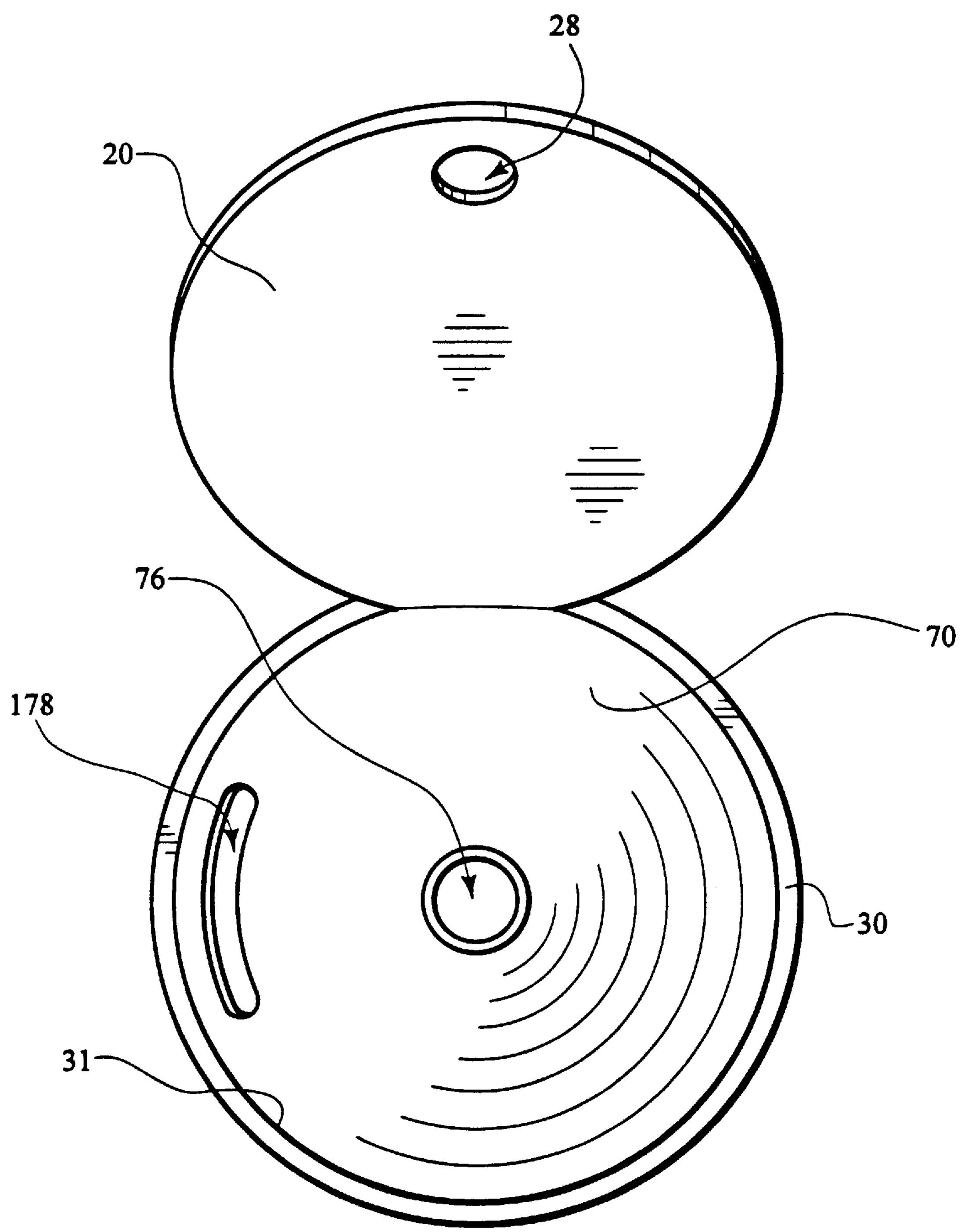
FIG. 5 is a top view of the closure of FIG. 1 showing the lid in an "open" position.
Figure 6:
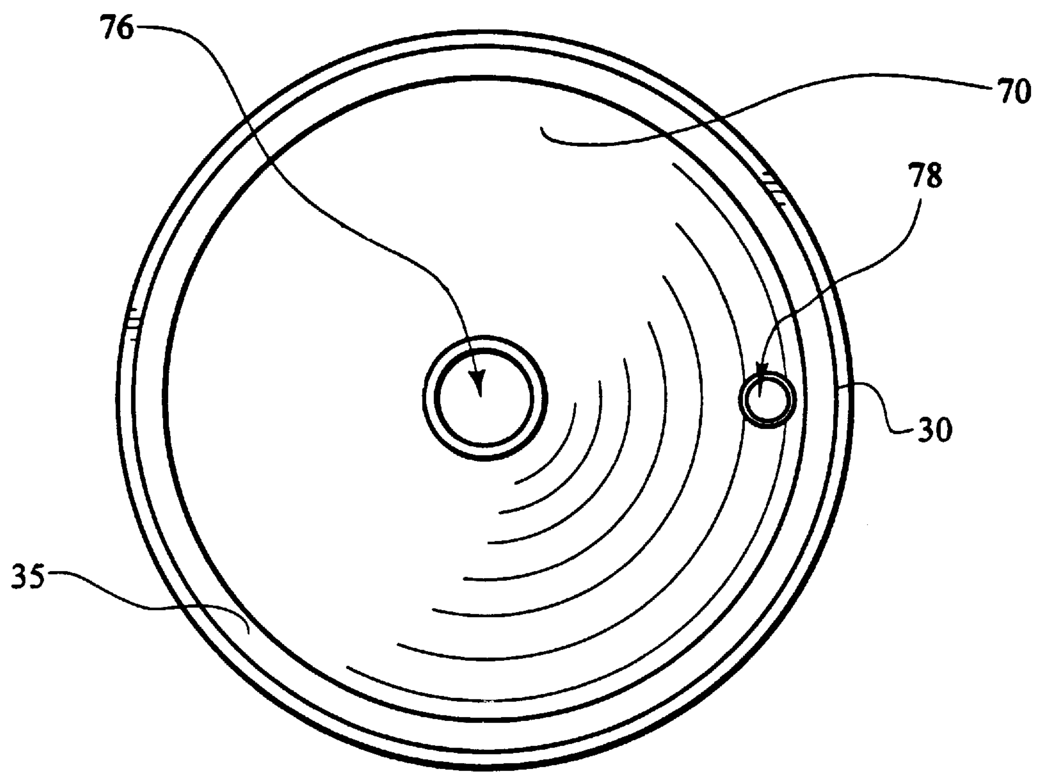
FIG. 6 is a bottom view of the closure of FIG. 1.

With reference to FIG. 5, yet another embodiment of the present invention includes a drain-back orifice 178 having a generally arcuate shape conforming substantially to the inner surface 31 of the side wall.

The foregoing detailed description is given primarily for clearness and understanding and no unnecessary limitations are to be understood therefrom. Modifications will become obvious to those skilled in the art upon reading this disclosure and may be made without departing from the spirit or the scope of the present invention.

I claim:

1. A closure, comprising:

a side wall having first and second distal ends, an inner surface and an outer perimeter;

a cone-shaped divider projecting inwardly and upwardly from a lower perimeter thereof, said lower perimeter being coincident to said inner surface of said side wall between said first and said second distal ends, said cone-shaped divider having an apex with an opening extending therethrough, said cone-shaped divider having a drain-back orifice therethrough near said lower perimeter thereof; and, a lid pivotally attached at an outer diameter thereof to said outer perimeter of said side wall at said first distal end thereof by an integral lid hinge, said outer diameter of said lid conforming substantially to said outer perimeter.

2. A closure according to claim 1, wherein said cone-shaped divider further comprises:

a cylindrical wall projecting upwardly from said apex of said divider defining a measuring orifice therethrough.

3. A closure according to claim 2, wherein:

said drain-back orifice includes a substantially arcuate shape conforming to said inner surface of said side wall.

4. A closure according to claim 1, wherein said lid further comprises:

a dispensing orifice disposed through said lid near said outer diameter thereof, said dispensing orifice being diametrically opposed to said lid hinge; and, a dispensing door pivotally attached to an upper surface of said lid by an integral door hinge, said door hinge being provided between said lid hinge and said dispensing orifice, said dispensing door projecting outwardly from said door hinge towards said outer diameter of said lid.

5. A closure according to claim 1, wherein said lid further comprises:

a plurality of measuring gradients provided on said upper surface of said lid.

6. A closure according to claim 1, wherein said side wall further comprises:

a continuous retaining bead projecting inwardly from said inner surface of said side wall near said second distal end thereof.

7. A closure according to claim 1, wherein said side wall further comprises:

a beveled retaining bead projecting inwardly from said inner surface of said side wall near said second distal end thereof, said beveled retaining bead having a beveled face disposed downwardly therefrom; and, a retaining shelf projecting inwardly from said inner surface of said side wall between said beveled retaining bead and said conical divider, said retaining shelf having an inner diameter less than an innermost point of said beveled retaining bead.

* * * * *